(12) United States Patent
Kawasaki

(10) Patent No.: US 11,523,007 B2
(45) Date of Patent: Dec. 6, 2022

(54) IMAGE READING SYSTEM, IMAGE READING DEVICE, AND SERVER DEVICE

(71) Applicant: SEIKO EPSON CORPORATION, Tokyo (JP)

(72) Inventor: Masayuki Kawasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/653,330

(22) Filed: Mar. 3, 2022

(65) Prior Publication Data

US 2022/0286567 A1 Sep. 8, 2022

(30) Foreign Application Priority Data

Mar. 3, 2021 (JP) ............................. JP2021-033527

(51) Int. Cl.
| | | |
|---|---|---|
| *G06F 3/12* | (2006.01) | |
| *G06F 15/00* | (2006.01) | |
| *G06K 1/00* | (2006.01) | |
| *H04N 1/00* | (2006.01) | |
| *H04N 1/32* | (2006.01) | |

(52) U.S. Cl.
CPC ..... *H04N 1/00244* (2013.01); *H04N 1/00225* (2013.01); *H04N 1/00241* (2013.01); *H04N 1/32545* (2013.01); *H04N 1/00811* (2013.01)

(58) Field of Classification Search
CPC ........... H04N 1/00244; H04N 1/00225; H04N 1/00241; H04N 1/00811; H04N 1/32545
See application file for complete search history.

(56) References Cited

U.S. PATENT DOCUMENTS

| | | | | |
|---|---|---|---|---|
| 2010/0231982 A1* | 9/2010 | Mihira | ............... | H04N 1/00482 358/402 |
| 2011/0128574 A1* | 6/2011 | Kouno | ............... | H04N 1/00482 358/1.15 |
| 2012/0099150 A1* | 4/2012 | Asamoto | ............ | H04N 1/00411 358/1.15 |
| 2013/0135640 A1* | 5/2013 | Nagasaki | ............. | G06K 15/005 358/1.11 |

FOREIGN PATENT DOCUMENTS

JP 2005176191 A 6/2005

\* cited by examiner

*Primary Examiner* — Moustapha Diaby
(74) *Attorney, Agent, or Firm* — Chip Law Group

(57) ABSTRACT

An image reading system includes a server device and a first scanner communicably connected to the server device. The server device includes a distributed scanning storage unit that stores distributed scanning setting information defining a setting item of distributed scanning and including identification information. The first scanner includes a first receiver that receives, from a user, a command that includes the identification information and is a command to perform the distributed scanning, a first acquirer that acquires the distributed scanning setting information from the server device when the first receiver receives the command to perform the distributed scanning, a first reader that reads a first document sheet stack to generate first read data based on the distributed scanning setting information, and a first transmitter that transmits the first read data to the server device.

8 Claims, 8 Drawing Sheets

IMAGE READING SYSTEM, IMAGE READING DEVICE, AND SERVER DEVICE

The present application is based on, and claims priority from JP Application Serial Number 2021-033527, filed Mar. 3, 2021, the disclosure of which is hereby incorporated by reference herein in its entirety.

BACKGROUND

1. Technical Field

The present disclosure relates to an image reading system, an image reading device, and a server device.

2. Related Art

A technique that relates to distributed scanning and merges data read by a plurality of scanners is known.

For example, JP-A-2005-176191 describes that a plurality of scanners is connected in a network environment, a user uses the first scanner to specify the second and subsequent scanners and merge data read by the scanners into a single file.

However, in the configuration described in JP-A-2005-176191, the user needs to use the first scanner to specify the second and subsequent scanners before distributed scanning is performed, and settings for the distributed scanning are complex.

SUMMARY

According to an aspect of the present disclosure, in order to solve the foregoing problems, an image reading system includes a server device, a first image reading device communicably connected to the server device, and a second image reading device communicably connected to the server device. The server device includes a distributed scanning storage unit that stores identification information identifying distributed scanning, and a distributed scanning setting including a setting item of the distributed scanning and associated with the identification information. The first image reading device includes a first receiver that receives, from a user, a command that includes the identification information and is a command to perform the distributed scanning, a first acquirer that acquires the distributed scanning setting associated with the identification information from the server device when the first receiver receives the command to perform the distributed scanning, a first reader that reads a first document sheet stack to generate first read data based on the distributed scanning setting, and a first transmitter that transmits the first read data to the server device. The second image reading device includes a second receiver that receives, from a user, a command that includes the identification information and is a command to perform the distributed scanning, a second acquirer that acquires the distributed scanning setting associated with the identification information from the server device when the second receiver receives the command to perform the distributed scanning, a second reader that reads a second document sheet stack to generate second read data based on the distributed scanning setting, and a second transmitter that transmits the second read data to the server device.

According to another aspect of the present disclosure, in order to solve the foregoing problems, an image reading device communicably connected to a server device includes a receiver that receives, from a user, a command that includes identification information identifying distributed scanning and is a command to perform the distributed scanning, an acquirer that acquires a distributed scanning setting associated with the identification information from the server device when the receiver receives the command to perform the distributed scanning, a reader that reads a document sheet stack to generate read data based on the distributed scanning setting, and a transmitter that transmits the read data to the server device.

According to still another aspect of the present disclosure, in order to solve the foregoing problems, a server device communicably connected to a first image reading device and a second image reading device includes a distributed scanning storage unit that stores identification information identifying distributed scanning, and a distributed scanning setting including a setting item of the distributes scanning and associated with the identification information, a server communication unit that transmits the distributed scanning setting associated with the identification information to the first image reading device and the second image reading device upon receiving a request for the distributed scanning setting specified in the identification information from the first image reading device or the second image reading device, receives first read data from the first image reading device, and receives second read data from the second image reading device, and a merging unit that merges the first read data received by the server communication unit with the second read data received by the server communication unit.

DESCRIPTION OF EXEMPLARY EMBODIMENTS

Embodiments include a first embodiment that is described with reference to FIGS. 1 to 5 and a second embodiment that is described with reference to FIGS. 1 to 3 and 6 to 8.

Figure 1:
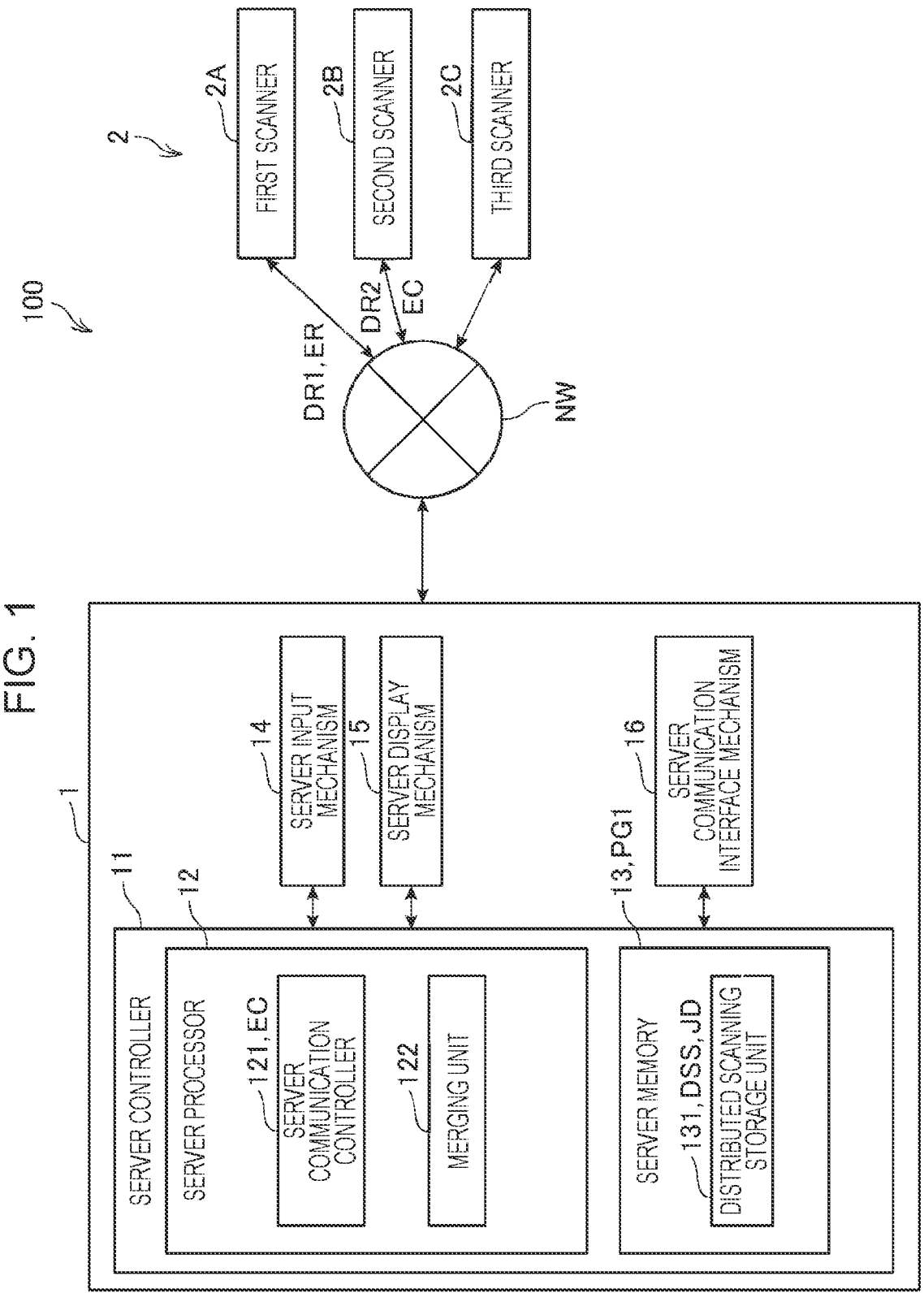
FIG. 1 is a diagram illustrating an example of an image reading system.

FIG. 1 is a diagram illustrating an example of an image reading system 100 including a configuration of a server device 1.

The server device 1 is communicably connected to scanners 2 via a network NW. The network NW is, for example, the Internet. The server device 1 transmits distributed scanning setting information DSS to the scanners 2 via the network NW.

The distributed scanning setting information DSS is information including a setting item of distributed scanning and associated with identification information JD identifying the distributed scanning.

The "distributed scanning" is to generate read data DR by the plurality of scanners 2 and merge the read data DR generated by the scanners 2 to generate a single file. The identification information JD is information that identifies one or more settings relating to the distributed scanning and is stored in the server device 1 in advance.

Each of the scanners 2 sets a requirement for reading based on the distributed scanning setting information DSS from the server device 1 and reads an image to generate read data DR. The scanners 2 transmit the generated read data DR to the server device 1.

The scanners 2 correspond to an example of "image reading devices".

In the present embodiment, the network NW is the Internet, but is not limited thereto. The network NW may be a local area network (LAN) or a wide area network (WAN).

The image reading system 100 according to the present embodiment includes, for example, a first scanner 2A, a second scanner 2B, and a third scanner 2C. When the first scanner 2A, the second scanner 2B, and the third scanner 2C are not distinguished, the first scanner 2A, the second scanner 2B, and the third scanner 2C are referred to as scanners 2. Specific identification information is assigned to each of the first scanner 2A, the second scanner 2B, and the third scanner 2C in advance. The specific identification information is Internet Protocol (IP) addresses or printer names.

The first scanner 2A corresponds to an example of a "first image reading device".

The second scanner 2B corresponds to an example of a "second image reading device".

The server device 1 determines, based on the specific identification information of the scanners 2, a scanner 2 to which the server device 1 transmits the distributed scanning setting information DSS. The scanners 2 generate read data in a predetermined format. The predetermined format is Portable Document Format (PDF), Tagged Image File Format (TIFF), Joint Photographic Experts Group (JPEG), or the like.

The server device 1 includes a server controller 11, a server input mechanism 14, a server display mechanism 15, and a server communication interface mechanism 16. In the present embodiment, although the server device 1 includes the server input mechanism 14 and the server display mechanism 15, the server input mechanism 14 and the server display mechanism 15 may be separated from the server device 1.

The server controller 11 controls operations of the units of the server device 1.

The server input mechanism 14 receives input from a user, generates an input signal corresponding to the received input, and transmits the input signal to the server controller 11. The server input mechanism 14 is, for example, a keyboard or a mouse.

The server display mechanism 15 includes a display screen such as a liquid crystal display (LCD) and displays various images on the display screen in accordance with a command from the server controller 11.

The server communication interface mechanism 16 communicates with the scanners 2 via the network NW in accordance with a command from the server controller 11. The server communication interface mechanism 16 communicates with the scanners 2 in accordance with, for example, an Ethernet (registered trademark) standard.

In the present embodiment, the server communication interface mechanism 16 communicates with the scanners 2 in accordance with the Ethernet standard, but is not limited thereto. The server communication interface mechanism 16 may communicate with the scanners 2 via wireless communication such as Wi-Fi (registered trademark).

The server controller 11 is a controller that includes a server processor 12 and a server memory 13.

The server memory 13 is a storage device that stores a program to be executed by the server processor 12 and data in a nonvolatile manner. The server memory 13 is a magnetic storage device such as a hard disk drive (HDD), a semiconductor storage device such as a solid-state drive (SSD), a semiconductor storage element such as a flash read-only memory (ROM), or another type of nonvolatile storage device. The server memory 13 may include a random-access memory (RAM) that constitutes a work area of the server processor 12. The server memory 13 stores data to be processed by the server controller 11 and a server control program PG1 to be executed by the server processor 12.

The server processor 12 may be a single processor, or a plurality of processors may function as the server processor 12. The server processor 12 executes the server control program PG1 to control the units of the server device 1.

In the present embodiment, although the server processor 12 executes the server control program PG1 to control the units of the server device 1, the server controller 11 may execute processing using a function implemented in an application-specific integrated circuit (ASIC), or a signal processing circuit may execute signal processing to execute the processing.

The server controller 11 includes a server communication controller 121, a merging unit 122, and a distributed scanning storage unit 131. The server processor 12 executes the server control program PG1 to function as the server communication controller 121 and the merging unit 122. In addition, the server processor 12 executes the server control program PG1 to cause the server memory 13 to function as the distributed scanning storage unit 131.

The server communication controller 121 corresponds to an example of a "server communication unit".

The server device 1 may include a time measuring unit not illustrated. The time measuring unit measures a time when the server device 1 receives a command to perform distributed scanning from each of the scanners 2.

After the configurations of the first and second scanners 2A and 2B are described with reference to FIGS. 2 and 3, the server communication controller 121, the merging unit 122, and the distributed scanning storage unit 131 are further described.

Figure 2:
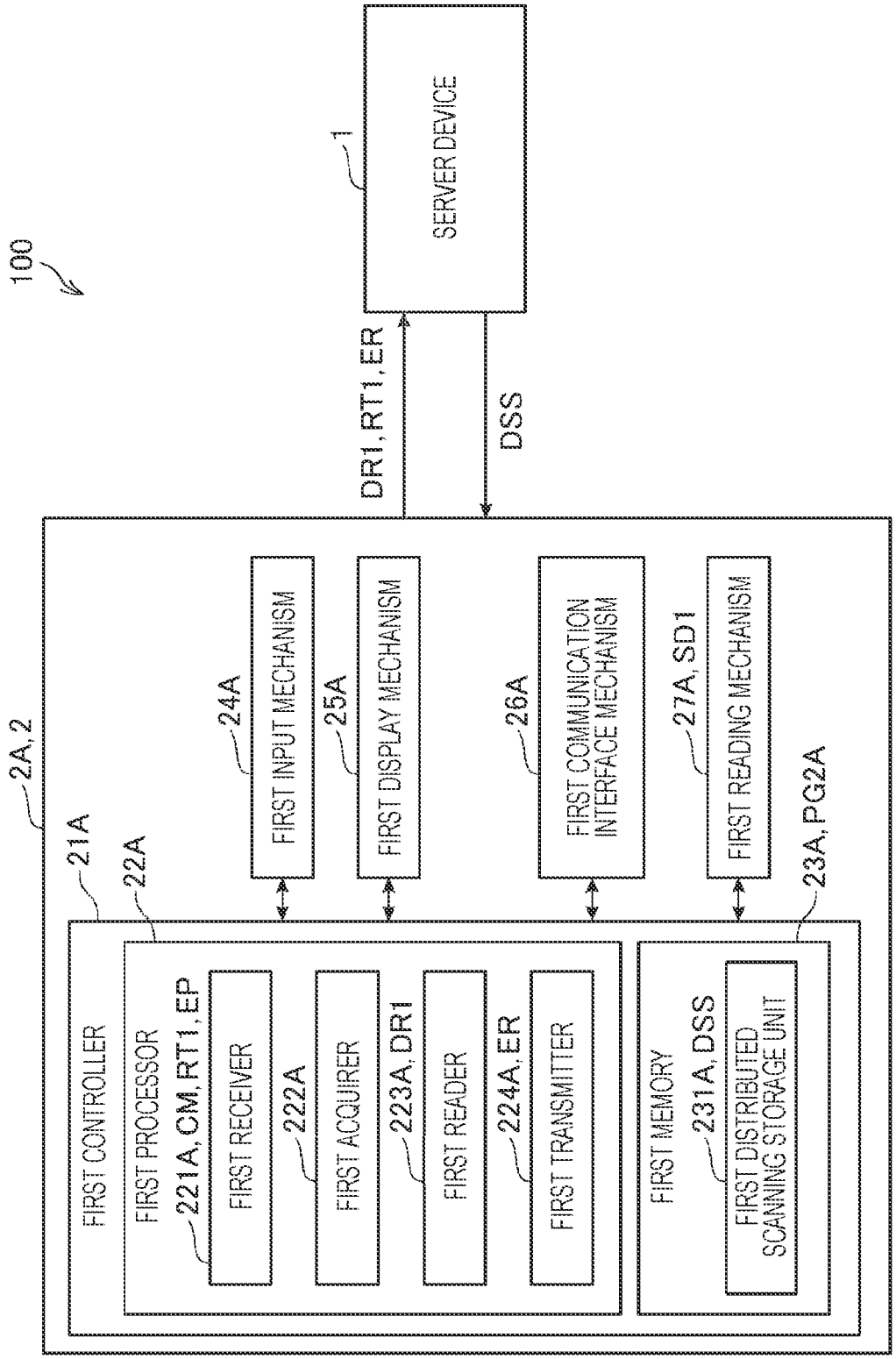
FIG. 2 is a diagram illustrating an example of a configuration of a first scanner.

FIG. 2 is a diagram illustrating an example of the configuration of the first scanner 2A.

As illustrated in FIG. 2, the first scanner 2A includes a first controller 21A, a first input mechanism 24A, a first display mechanism 25A, a first communication interface mechanism 26A, and a first reading mechanism 27A.

The first controller 21A controls operations of the units of the first scanner 2A.

The first input mechanism 24A receives input from a user, generates an input signal corresponding to the received input, and transmits the input signal to the first controller 21A. The first input mechanism 24A includes various hardware keys, a touch panel, or the like.

The first display mechanism 25A includes a display screen such as an LCD and displays various images on the display screen in accordance with a command from the first controller 21A. When the first input mechanism 24A includes the touch panel, a display mechanism of the touch panel corresponds to the first display mechanism 25A.

The first communication interface mechanism 26A communicates with the server device 1 via the network NW in accordance with a command from the first controller 21A. The first communication interface mechanism 26A communicates with the server device 1 in accordance with the Ethernet (registered trademark) standard.

The first reading mechanism 27A includes an image sensor such as a charge-coupled device (CCD) or a complementary metal-oxide-semiconductor (C-MOS). The first reading mechanism 27A reads an image printed on a document sheet such as recording paper to generate first read data DR1 in accordance with a command from the first controller 21A.

The first reading mechanism 27A includes an automatic document feeder (ADF). A document sheet included in a first document sheet stack SD1 mounted on a document sheet mounting section of the ADF is subsequently fed in the order from a document sheet mounted at the top of the first document sheet stack SD1 or at the bottom of the first document sheet stack SD1, and the first reading mechanism 27A uses the image sensor to sequentially read an image printed on the document sheet included in the first document sheet stack SD1 to generate first read data DR1.

The first controller 21A is a controller that includes a first processor 22A and a first memory 23A.

The first memory 23A is a storage device that stores a program to be executed by the first processor 22A and data in a nonvolatile manner. The first memory 23A is a magnetic storage device such as an HDD, a semiconductor storage device such as an SSD, a semiconductor storage element such as a flash ROM, or another type of nonvolatile storage device. The first memory 23A may include a RAM that constitutes a work area of the first processor 22A. The first memory 23A stores data to be processed by the first controller 21A and a first control program PG2A to be executed by the first processor 22A.

The first processor 22A may be a single processor, or a plurality of processors may function as the first processor 22A. The first processor 22A executes the first control program PG2A to control the units of the first scanner 2A.

In the present embodiment, although the first processor 22A executes the first control program PG2A to control the units of the first scanner 2A, the first controller 21A may execute processing using a function implemented in an ASIC, or a signal processing circuit may execute signal processing to execute the processing.

The first controller 21A includes a first receiver 221A, a first acquirer 222A, a first reader 223A, a first transmitter 224A, and a first distributed scanning storage unit 231A. The first processor 22A executes the first control program PG2A to function as the first receiver 221A, the first acquirer 222A, the first reader 223A, and the first transmitter 224A. In addition, the first processor 22A executes the first control program PG2A to cause the first memory 23A to function as the first distributed scanning storage unit 231A.

The first receiver 221A, the first acquirer 222A, the first reader 223A, the first transmitter 224A, and the first distributed scanning storage unit 231A are further described after the configuration of the second scanner 2B is described with reference to FIG. 3.

Figure 3:
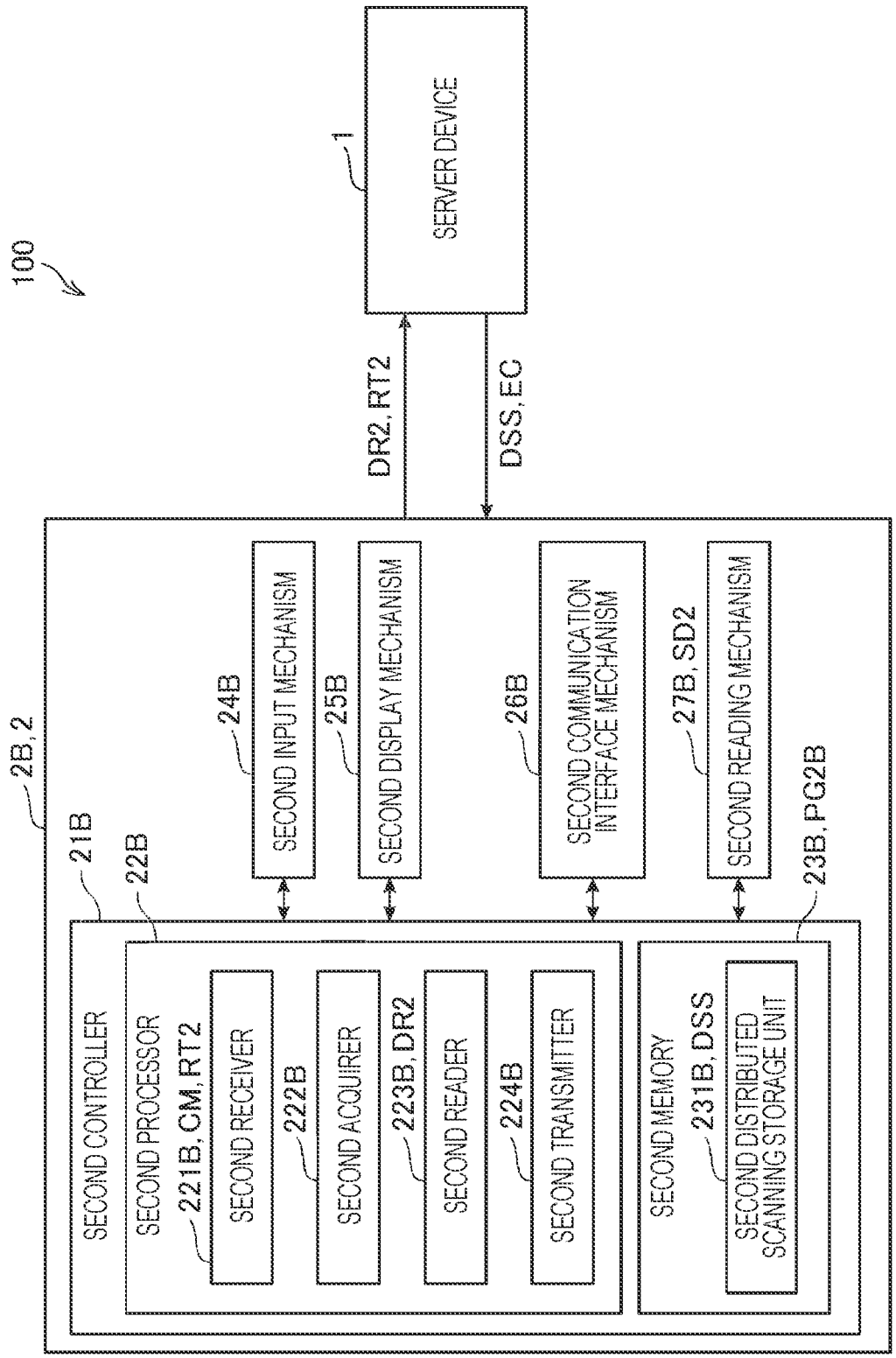
FIG. 3 is a diagram illustrating an example of a configuration of a second scanner.

FIG. 3 is a diagram illustrating an example of the configuration of the second scanner 2B.

The configuration of the second scanner 2B is substantially the same as that of the third scanner 2C. Therefore, FIG. 3 illustrates the configuration of the second scanner 2B, and the configuration of the third scanner 2C will not be described.

As illustrated in FIG. 3, the second scanner 2B includes a second controller 21B, a second input mechanism 24B, a second display mechanism 25B, a second communication interface mechanism 26B, and a second reading mechanism 27B.

The second controller 21B controls operations of the units of the second scanner 2B.

The second input mechanism 24B receives input from a user, generates an input signal corresponding to the received input, and transmits the input signal to the second controller 21B. The second input mechanism 24B includes various hardware keys, a touch panel, or the like.

The second display mechanism 25B includes a display screen such as an LCD and displays various images on the display screen in accordance with a command from the second controller 21B. When the second input mechanism 24B includes the touch panel, a display mechanism of the touch panel corresponds to the second display mechanism 25B.

The second communication interface mechanism 26B communicates with the server device 1 via the network NW in accordance with a command from the second controller 21B. The second communication interface mechanism 26B communicates with the server device 1 in accordance with the Ethernet (registered trademark) standard.

The second reading mechanism 27B includes an image sensor such as a CCD or a C-MOS. The second reading mechanism 27B reads an image printed on a document sheet such as recording paper to generate second read data DR2 in accordance with a command from the second controller 21B.

In addition, the second reading mechanism 27B includes an ADF. A document sheet included in a second document sheet stack SD2 mounted on a document sheet mounting section of the ADF is subsequently fed in the order from a document sheet mounted at the top of the second document sheet stack SD2 or at the bottom of the second document sheet stack SD2, and the second reading mechanism 27B uses the image sensor to sequentially read an image printed on the document sheet included in the second document sheet stack SD2 to generate second read data DR2.

The second controller 21B is a controller that includes a second processor 22B and a second memory 23B.

The second memory 23B is a storage device that stores a program to be executed by the second processor 22B and data in a nonvolatile manner. The second memory 23B is a magnetic storage device such as an HDD, a semiconductor storage device such as an SSD, a semiconductor storage element such as a flash ROM, or another type of nonvolatile storage device. The second memory 23B may include a RAM that constitutes a work area of the second processor 22B. The second memory 23B stores data to be processed by the second controller 21B and a second control program PG2B to be executed by the second processor 22B.

The second processor 22B may be a single processor, or a plurality of processors may function as the second processor 22B. The second processor 22B executes the second control program PG2B to control the units of the second scanner 2B.

In the present embodiment, although the second processor 22B executes the second control program PG2B to control the units of the second scanner 2B, the second controller 21B may execute processing using a function implemented in an ASIC, or a signal processing circuit may execute signal processing to execute the processing.

The second controller 21B includes a second receiver 221B, a second acquirer 222B, a second reader 223B, a second transmitter 224B, and a second distributed scanning storage unit 231B. The second processor 22B executes the second control program PG2B to function as the second receiver 221B, the second acquirer 222B, the second reader 223B, and the second transmitter 224B. In addition, the second processor 22B executes the second control program PG2B to cause the second memory 23B to function as the second distributed scanning storage unit 231B.

1. Main Units of First Embodiment

Configurations of the server controller 11, the first controller 21A, and the second controller 21B according to the first embodiment are described with reference to FIGS. 1 to 3.

FIG. 1 illustrates the configuration of the server controller 11 according to the first embodiment.

The distributed scanning storage unit 131 stores the distributed scanning setting information DSS.

The distributed scanning setting information DSS corresponds to a distributed scanning setting including a setting item of distributed scanning. The distributed scanning setting information DSS includes the identification information JD.

The distributed scanning setting includes a reception period ET to a time when the reception of a command CM to perform the distributed scanning is ended. The reception period ET is an allowable value of a time period from a time when the first receiver 221A of the first scanner 2A receives a command CM to perform the distributed scanning to a time when the second receiver 221B of the second scanner 2B receives a command CM to perform the distributed scanning. In other words, when the second receiver 221B of the second scanner 2B receives the command CM to perform the distributed scanning after the reception period ET elapses from the time when the first receiver 221A of the first scanner 2A receives the command CM to perform the distributed scanning, the second read data DR2 is not merged with the first read data DR1. The reception period ET is, for example, 5 minutes.

When the server communication controller 121 receives, from the first scanner 2A, a request that includes the identification information JD and is a request to transmit the distributed scanning setting information DSS, the server communication controller 121 transmits, to the first scanner 2A, the distributed scanning setting information DSS associated with the identification information JD received from the first scanner 2A.

Similarly, when the server communication controller 121 receives, from the second scanner 2B, a request that includes the identification information JD and is a request to transmit the distributed scanning setting information DSS, the server communication controller 121 transmits, to the second scanner 2B, the distributed scanning setting information DSS associated with the identification information JD received from the second scanner 2B. In addition, when the server communication controller 121 receives, from the third scanner 2C, a request that includes the identification information JD and is a request to transmit the distributed scanning setting information DSS, the server communication controller 121 transmits, to the third scanner 2C, the distributed scanning setting information DSS associated with the identification information JD received from the third scanner 2C.

The server communication controller 121 receives the first read data DR1 from the first scanner 2A, receives the second read data DR2 from the second scanner 2B, and receives third read data DR3 from the third scanner 2C.

The merging unit 122 merges the first read data DR1, the second read data DR2, and the third read data DR3.

The process by the merging unit 122 is further described after the configuration of the first controller 21A according to the first embodiment is described with reference FIG. 2 and the configuration of the second controller 21B according to the first embodiment is described with reference to FIG. 3.

FIG. 2 illustrates the configuration of the first controller 21A according to the first embodiment.

The first distributed scanning storage unit 231A stores the distributed scanning setting information DSS acquired by the first acquirer 222A from the server device 1.

The first receiver 221A receives the identification information JD identifying a distributed scanning job and specified by the user and receives a command CM to perform the distributed scanning from the user. Upon receiving the command CM to perform the distributed scanning, the first receiver 221A acquires first reception time and date information RT1 from a time measuring unit not illustrated. The time measuring unit is included in the first controller 21A and has a clock function.

The first receiver 221A corresponds to an example of a "receiver".

When the first receiver 221A receives the command CM to perform the distributed scanning, the first acquirer 222A acquires the distributed scanning setting information DSS including the specified identification information JD from the server device 1.

The first acquirer 222A corresponds to an example of an "acquirer".

The first reader 223A reads the first document sheet stack SD1 to generate the first read data DR1 based on the distributed scanning setting information DSS.

The first reader 223A corresponds to an example of a "reader".

The first transmitter 224A transmits the first read data DR1 to the server device 1. In addition, the first transmitter 224A associates the first read data DR1 with the first reception time and date information RT1 and transmits the first reception time and date information RT1 to the server device 1.

The first transmitter 224A corresponds to an example of a "transmitter".

FIG. 3 illustrates the configuration of the second controller 21B according to the first embodiment.

The second distributed scanning storage unit 231B stores the distributed scanning setting information DSS acquired by the second acquirer 222B from the server device 1.

The second receiver 221B receives the identification information JD identifying a distributed scanning job and specified by the user and receives a command CM to perform the distributed scanning from the user. Upon receiving the command CM to perform the distributed scanning, the second receiver 221B acquires second reception time and date information RT2 from a time measuring unit not illustrated. The time measuring unit is included in the second controller 21B and has a clock function.

The second receiver 221B corresponds to an example of a "receiver".

When the second receiver 221B receives the command CM to perform the distributed scanning, the second acquirer 222B acquires the distributed scanning setting information DSS including the specified identification information JD from the server device 1.

The second acquirer 222B corresponds to an example of an "acquirer".

The second reader 223B reads the second document sheet stack SD2 to generate the second read data DR2 based on the distributed scanning setting information DSS.

The second reader 223B corresponds to an example of a "reader".

The second transmitter 224B transmits the second read data DR2 to the server device 1. The second transmitter 224B associates the second reception time and date information RT2 with the second read data DR2 and transmits the second reception time and date information RT2 to the server device 1.

The second transmitter 224B corresponds to an example of a "transmitter".

The third scanner 2C has substantially the same configuration as that of the second scanner 2B.

The third scanner 2C associates third reception time and date information RT3 with the third read data DR3 and transmits the third reception time and date information RT3 to the server device 1.

The merging unit 122 illustrated in FIG. 1 performs the following process.

The process that is performed by the merging unit 122 when the server device 1 receives the first read data DR1 and the second read data DR2 is as follows.

When the second receiver 221B receives a command CM to perform the distributed scanning specified in the identification information JD before the reception period ET elapses from a time and date indicated by the first reception time and date information RT1 indicating the time when the first receiver 221A receives the command CM to perform the distributed scanning specified in the identification information JD, the merging unit 122 merges the first read data DR1 with the second read data DR2.

In other words, when a time and date indicated by the second reception time and date information RT2 are before the reception period ET elapses from the time and date indicated by the first reception time and date information RT1, the merging unit 122 merges the first read data DR1 with the second read data DR2.

When the second receiver 221B receives a command CM to perform the distributed scanning specified in the identification information JD after the reception period ET elapses from the time and date indicated by the first reception time and date information RT1 indicating the time when the first receiver 221A receives the command CM to perform the distributed scanning specified in the identification information JD, the merging unit 122 does not merge the first read data DR1 with the second read data DR2.

In other words, when the time and date indicated by the second reception time and date information RT2 are after the reception period ET elapses from the time and date indicated by the first reception time and date information RT1, the merging unit 122 does not merge the first read data DR1 with the second read data DR2.

Next, the case where the server device 1 receives the first read data DR1, the second read data DR2, and the third read data DR3 is described.

When each of the second scanner 2B and the third scanner 2C receives a command CM to perform the distributed scanning before the reception period ET elapses from the time and date indicated by the first reception time and date information RT1 indicating the time when the first receiver 221A receives the command CM to perform the distributed scanning, the merging unit 122 merges the first read data DR1, the second read data DR2, and the third read data DR3.

In other words, when the time and date indicated by the second reception time and date information RT2 and a time and date indicated by the third reception time and date information RT3 are before the reception period ET elapses from the time and date indicated by the first reception time and date information RT1, the merging unit 122 merges the first read data DR1, the second read data DR2, and the third read data DR3.

When the third scanner 2C receives a command CM to perform the distributed scanning after the reception period ET elapses from the time and date indicated by the first reception time and date information RT1 indicating the time when the first receiver 221A receives the command CM to perform the distributed scanning, the merging unit 122 does not merge the first read data DR1 with the third read data DR3. In this case, when the second scanner 2B receives a command CM to perform the distributed scanning before the reception period ET elapses from the time and date indicated by the first reception time and date information RT1, the merging unit 122 merges the first read data DR1 with the second read data DR2.

In other words, when the time and date indicated by the third reception time and date information RT3 are after the reception period ET elapses from the time and date indicated by the first reception time and date information RT1, the merging unit 122 does not merge the first read data DR1 with the third read data DR3.

Figure 4:
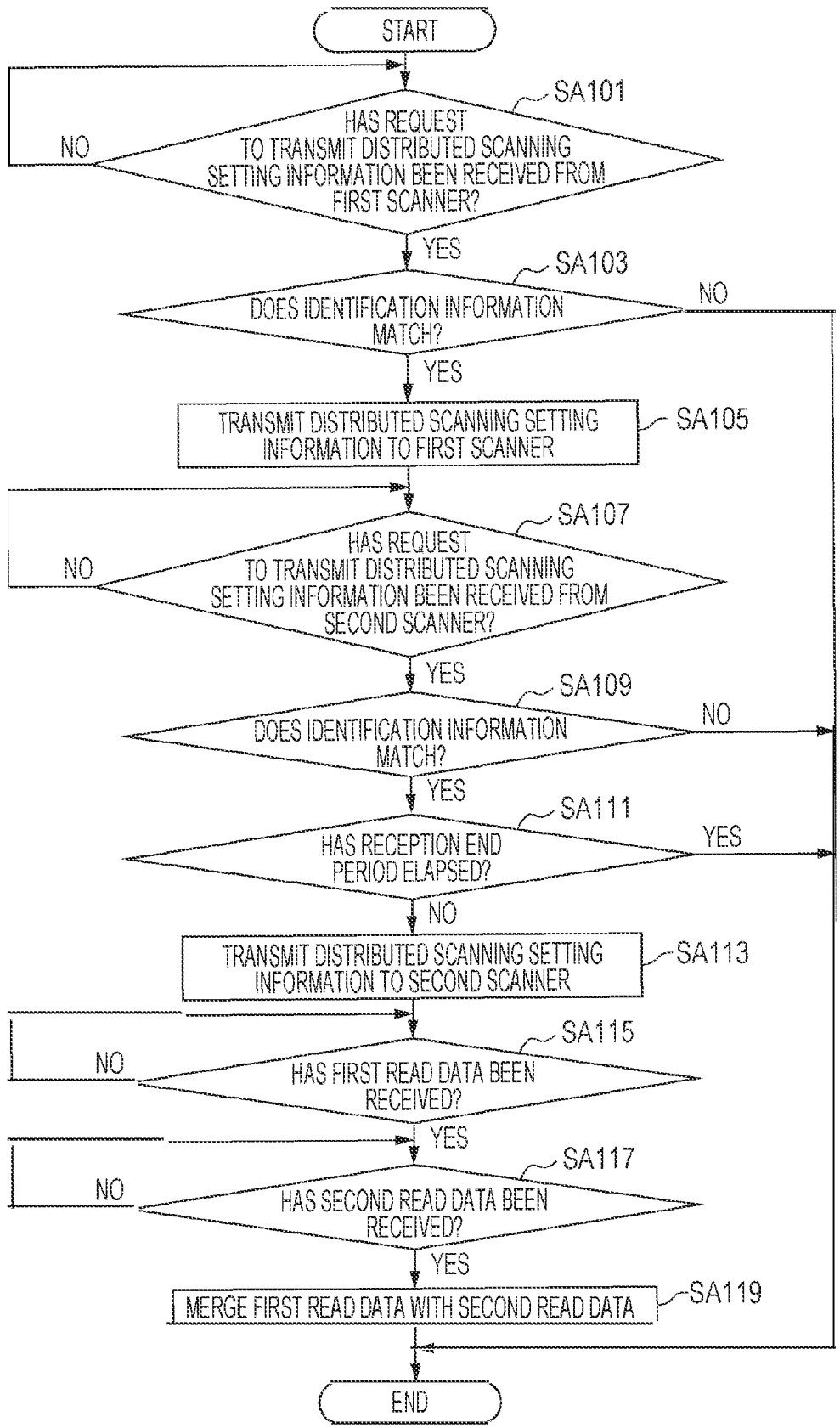
FIG. 4 is a flowchart illustrating an example of a process to be performed by a server device.
Figure 5:
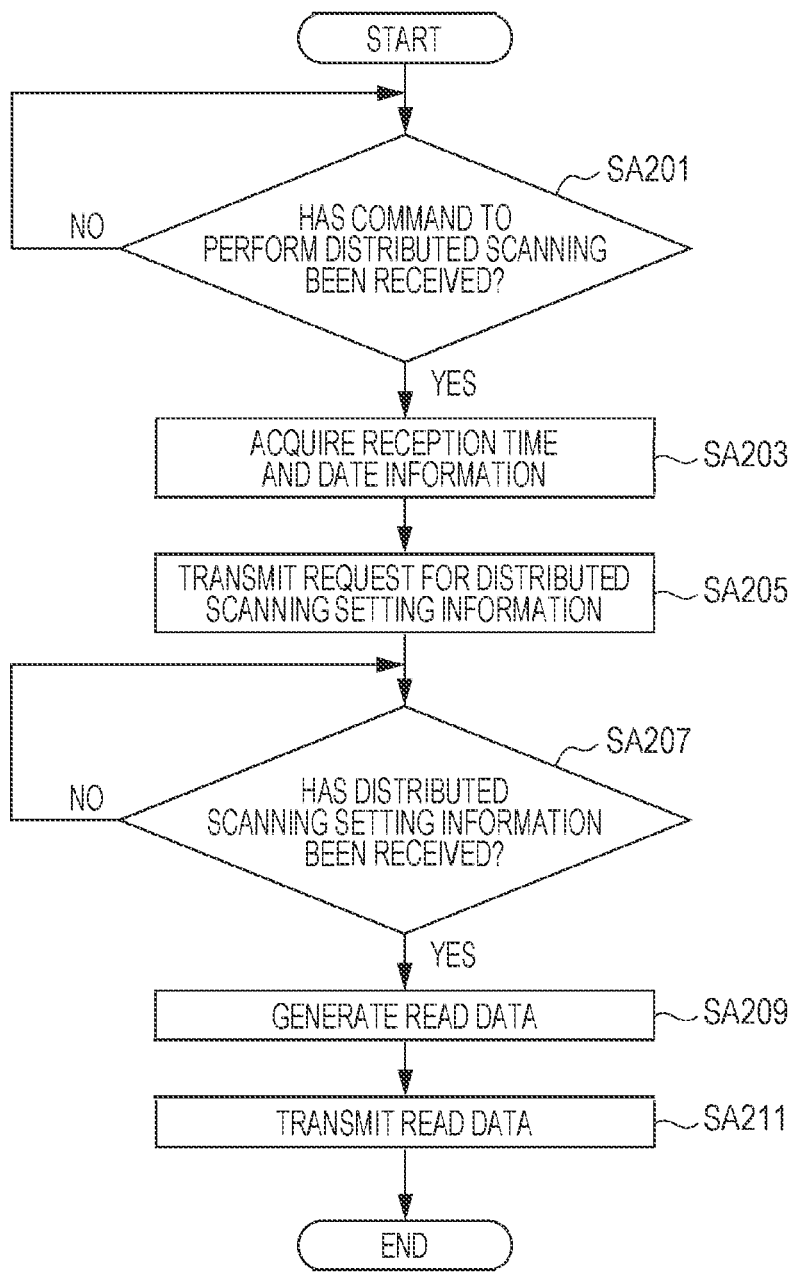
FIG. 5 is a flowchart illustrating an example of a process to be performed by the scanners.

Next, processes to be performed by the server controller 11, the first controller 21A, and the second controller 21B according to the first embodiment are described with reference to FIGS. 4 and 5. FIGS. 4 and 5 illustrate, for convenience, the case where the server device 1 receives the first read data DR1 from the first scanner 2A, receives the second read data DR2 from the second scanner 2B, and does not receive the third read data DR3 from the third scanner 2C. In FIG. 4, the distributed scanning storage unit 131 stores identification information JD and distributed scanning setting information DSS associated with the identification information JD in advance.

FIG. 4 is a flowchart illustrating an example of a process to be performed by the server controller 11 of the server device 1 according to the first embodiment.

As illustrated in FIG. 4, in step SA101, the server communication controller 121 determines whether the server communication controller 121 has received, from the first scanner 2A, a request that includes identification information JD and is a request to transmit distributed scanning setting information DSS, and first reception time and date information RT1.

When the server communication controller 121 determines that the server communication controller 121 has not received, from the first scanner 2A, the request to transmit the distributed scanning setting information DSS (NO in step SA101), the process becomes a standby state. When the server communication controller 121 determines that the server communication controller 121 has received, from the first scanner 2A, the request to transmit the distributed scanning setting information DSS and the first reception time and date information RT1 (YES in step SA101), the process proceeds to step SA103.

In step SA103, the server communication controller 121 determines whether the identification information JD received from the first scanner 2A matches the identification information JD of the distributed scanning setting information DSS stored in the distributed scanning storage unit 131.

When the server communication controller 121 determines that the identification information JD received from the first scanner 2A does not match the identification information JD of the distributed scanning setting information DSS stored in the distributed scanning storage unit 131 (NO in step SA103), the process is ended. When the server communication controller 121 determines that the identification information JD received from the first scanner 2A matches the identification information JD of the distributed scanning setting information DSS stored in the distributed scanning storage unit 131 (YES in step SA103), the process proceeds to step SA105.

In step SA105, the server communication controller 121 transmits the distributed scanning setting information DSS associated with the identification information JD to the first scanner 2A.

After transmitting the distributed scanning setting information DSS to the first scanner 2A, the server communication controller 121 determines whether the server communication controller 121 has received, from the second scanner 2B, a request that includes identification information JD and is a request to transmit distributed scanning setting information DSS, and second reception time and date information RT2 in step SA107.

When the server communication controller 121 determines that the server communication controller 121 has not received, from the second scanner 2B, the request to transmit the distributed scanning setting information DSS (NO in step SA107), the process becomes the standby state. When the server communication controller 121 determines that the server communication controller 121 has received, from the second scanner 2B, the request to transmit the distributed scanning setting information DSS and the second reception time and date information RT2 (YES in step SA107), the process proceeds to step SA109.

In step SA109, the server communication controller 121 determines whether the identification information JD received from the second scanner 2B matches the identification information JD received from the first scanner 2A.

When the server communication controller 121 determines that the identification information JD received from the second scanner 2B does not match the identification information JD received from the first scanner 2A (NO in step SA109), the server communication controller 121 determines whether the identification information JD received from the second scanner 2B matches the identification information JD of the distributed scanning setting information DSS stored in the distributed scanning storage unit 131.

When the server communication controller 121 determines that the identification information JD received from the second scanner 2B does not match the identification information JD of the distributed scanning setting information DSS stored in the distributed scanning storage unit 131 (NO in step SA109), the process is ended. When the server communication controller 121 determines that the identification information JD received from the second scanner 2B matches the identification information JD received from the first scanner 2A (YES in step SA109), the process proceeds to step SA111.

In step SA111, the merging unit 122 determines whether a time and date indicated by the second reception time and date information RT2 are after the reception period ET elapses from a time and date indicated by the first reception time and date information RT1.

When the merging unit 122 determines that the time and date indicated by the second reception time and date information RT2 are after the reception period ET elapses from the time and date indicated by the first reception time and date information RT1 (YES in step SA111), the process is ended. When the merging unit 122 determines that the time and date indicated by the second reception time and date information RT2 are not after the reception period ET elapses from the time and date indicated by the first reception time and date information RT1 (NO in step SA111), the process proceeds to step SA113.

In step SA113, the server communication controller 121 transmits, to the second scanner 2B, the distributed scanning setting information DSS that is the same as the distributed scanning setting information DSS transmitted to the first scanner 2A and is associated with the identification information JD.

After transmitting the distributed scanning setting information DSS to the second scanner 2B, the server communication controller 121 determines whether the server communication controller 121 has received the first read data DR1 from the first scanner 2A in step SA115.

When the server communication controller 121 determines that the server communication controller 121 has not received the first read data DR1 from the first scanner 2A (NO in step SA115), the process becomes the standby state. When the server communication controller 121 determines that the server communication controller 121 has received the first read data DR1 from the first scanner 2A (YES in step SA115), the process proceeds to step SA117.

In step SA117, the server communication controller 121 determines whether the server communication controller 121 has received the second read data DR2 from the second scanner 2B.

When the server communication controller 121 determines that the server communication controller 121 has not received the second read data DR2 from the second scanner 2B (NO in step SA117), the process becomes the standby state. When the server communication controller 121 determines that the server communication controller 121 has received the second read data DR2 from the second scanner 2B (YES in step SA117), the process proceeds to step SA119.

When the server communication controller 121 determines that the server communication controller 121 has received the first read data DR1 and the second read data DR2, the merging unit 122 merges the first read data DR1 with the second read data DR2 in step SA119. After that, the process is ended.

FIG. 5 is a flowchart illustrating an example of a process to be performed by the first controller 21A of the first scanner 2A and the second controller 21B of the second scanner 2B. The following process is described as a process to be performed by the first controller 21A of the first scanner 2A for convenience.

As illustrated in FIG. 5, in step SA201, the first receiver 221A determines whether the first receiver 221A has received a command CM to perform the distributed scanning.

When the first receiver 221A determines that the first receiver 221A has not received the command CM to perform the distributed scanning (NO in step SA201), the process becomes a standby state. When the first receiver 221A determines that the first receiver 221A has received the command CM to perform the distributed scanning (YES in step SA201), the process proceeds to step SA203.

In step SA203, the first receiver 221A acquires the first reception time and date information RT1.

After the first receiver 221A determines that the first receiver 221A has received the command CM to perform the distributed scanning, the first acquirer 222A transmits, to the server device 1, a request for the distributed scanning setting information DSS and the first reception time and date information RT1 in step SA205.

After the first acquirer 222A transmits, to the server device 1, the request for the distributed scanning setting information DSS and the first reception time and date information RT1, the first acquirer 222A determines whether the first acquirer 222A has received the distributed scanning setting information DSS from the server device 1 in step SA207.

When the first acquirer 222A determines that the first acquirer 222A has not received the distributed scanning setting information DSS (NO in step SA207), the process becomes the standby state. When the first acquirer 222A determines that the first acquirer 222A has received the distributed scanning setting information DSS (YES in step SA207), the process proceeds to step SA209.

In step SA209, the first reader 223A reads the first document sheet stack SD1 to generate the first read data DR1 based on the distributed scanning setting information DSS.

Next, in step SA211, the first transmitter 224A transmits the first read data DR1 to the server device 1. After that, the process is ended.

In the first embodiment, as described with reference to FIGS. 4 and 5, the merging unit 122 determines whether to merge the first read data DR1 with the second read data DR2 based on the first reception time and date information RT1, the second reception time and date information RT2, and the reception period ET. Therefore, it is possible to appropriately determine whether to merge the first read data DR1 with the second read data DR2 by setting the reception period ET to an appropriate value.

Main Units of Second Embodiment

Configurations of a server controller 11, a first controller 21A, and a second controller 21B according to the second embodiment are described with reference to FIGS. 1 to 3.

Configurations that are included in the configuration of the server controller 11 according to the second embodiment and are different from the server controller 11 according to the first embodiment are mainly described, and configurations that are included in the configuration of the server controller 11 according to the second embodiment and are common to the server controller 11 according to the first embodiment may not be described.

As illustrated in FIG. 1, the server controller 11 includes a server communication controller 121, a merging unit 122, and a distributed scanning storage unit 131.

The distributed scanning storage unit 131 stores distributed scanning setting information DSS. The distributed scanning setting information DSS corresponds to a distributed scanning setting including a setting item of distributed scanning. The distributed scanning setting information DSS includes identification information JD.

The distributed scanning storage unit 131 according to the second embodiment is different from the distributed scanning storage unit 131 according to the first embodiment in that the distributed scanning setting does not include a reception period ET as a setting item.

The merging unit 122 merges first read data DR1 with second read data DR2.

The merging unit 122 according to the first embodiment determines, based on first reception time and date information RT1, second reception time and date information RT2, and a reception period ET, whether to merge the first read data DR1 with the second read data DR2. On the other hand, the merging unit 122 according to the second embodiment determines, based on reception end information ER received from a first scanner 2A, whether to merge the first read data DR1 with the second read data DR2.

As illustrated in FIG. 2, the first controller 21A of the first scanner 2A includes a first receiver 221A, a first acquirer 222A, a first reader 223A, a first transmitter 224A, and a first distributed scanning storage unit 231A.

The first receiver 221A is different from the first receiver 221A according to the first embodiment in that the first receiver 221A does not acquire first reception time and date information RT1 from a time measuring unit not illustrated upon receiving a command CM to perform distributed scanning.

In addition, the first receiver 221A is different from the first receiver 221A according to the first embodiment in that the first receiver 221A receives, from a user, a reception end operation EP indicating the end of the reception of distributed scanning.

The first transmitter 224A is different from the first transmitter 224A according to the first embodiment in that the first transmitter 224A does not transmit first reception time and date information RT1 to a server device 1. The first transmitter 224A is different from the first transmitter 224A according to the first embodiment in that, when the first receiver 221A receives the reception end operation EP, the first transmitter 224A transmits, to the server device 1, the reception end information ER indicating that the reception end operation EP has been received.

The server communication controller 121 of the server device 1 is different from the server communication controller 121 according to the first embodiment in that the server communication controller 121 transmits, to a second scanner 2B, a reception end command EC to end the reception of distributed scanning upon receiving the reception end information ER from the first transmitter 224A of the first scanner 2A.

As illustrated in FIG. 3, the second controller 21B of the second scanner 2B includes a second receiver 221B, a second acquirer 222B, a second reader 223B, a second transmitter 224B, and a second distributed scanning storage unit 231B.

The second receiver 221B is different from the second receiver 221B according to the first embodiment in that the second receiver 221B does not acquire second reception time and date information RT2 from a time measuring unit not illustrated upon receiving a command CM to perform distributed scanning.

The second transmitter 224B is different from the second transmitter 224B according to the first embodiment in that the second transmitter 224B does not transmit second reception time and date information RT2 to the server device 1.

A process to be performed by the merging unit 122 illustrated in FIG. 1 in the second embodiment is described below in detail.

The case where the server device 1 receives the first read data DR1 and the second read data DR2 is described below.

When the server communication controller 121 receives the first read data DR1 and the second read data DR2 before receiving the reception end information ER from the first scanner 2A, the merging unit 122 merges the first read data DR1 with the second read data DR2.

When the server communication controller 121 receives the second read data DR2 after receiving the reception end information ER from the first scanner 2A, the merging unit 122 does not merge the first read data DR1 with the second read data DR2.

The case where the server device 1 receives the first read data DR1, the second read data DR2, and third read data DR3 is described below.

When the server communication controller 121 receives the first read data DR1, the second read data DR2, and the third read data DR3 before receiving the reception end information ER from the first scanner 2A, the merging unit 122 merges the first read data DR1, the second read data DR2, and the third read data DR3.

When the server communication controller 121 receives the third read data DR3 after receiving the reception end information ER from the first scanner 2A, the merging unit 122 does not merge the first read data DR1 with the third read data DR3. In this case, when the server communication controller 121 receives the second read data DR2 before receiving the reception end information ER from the first scanner 2A, the merging unit 122 merges the first read data DR1 with the second read data DR2.

Figure 6:
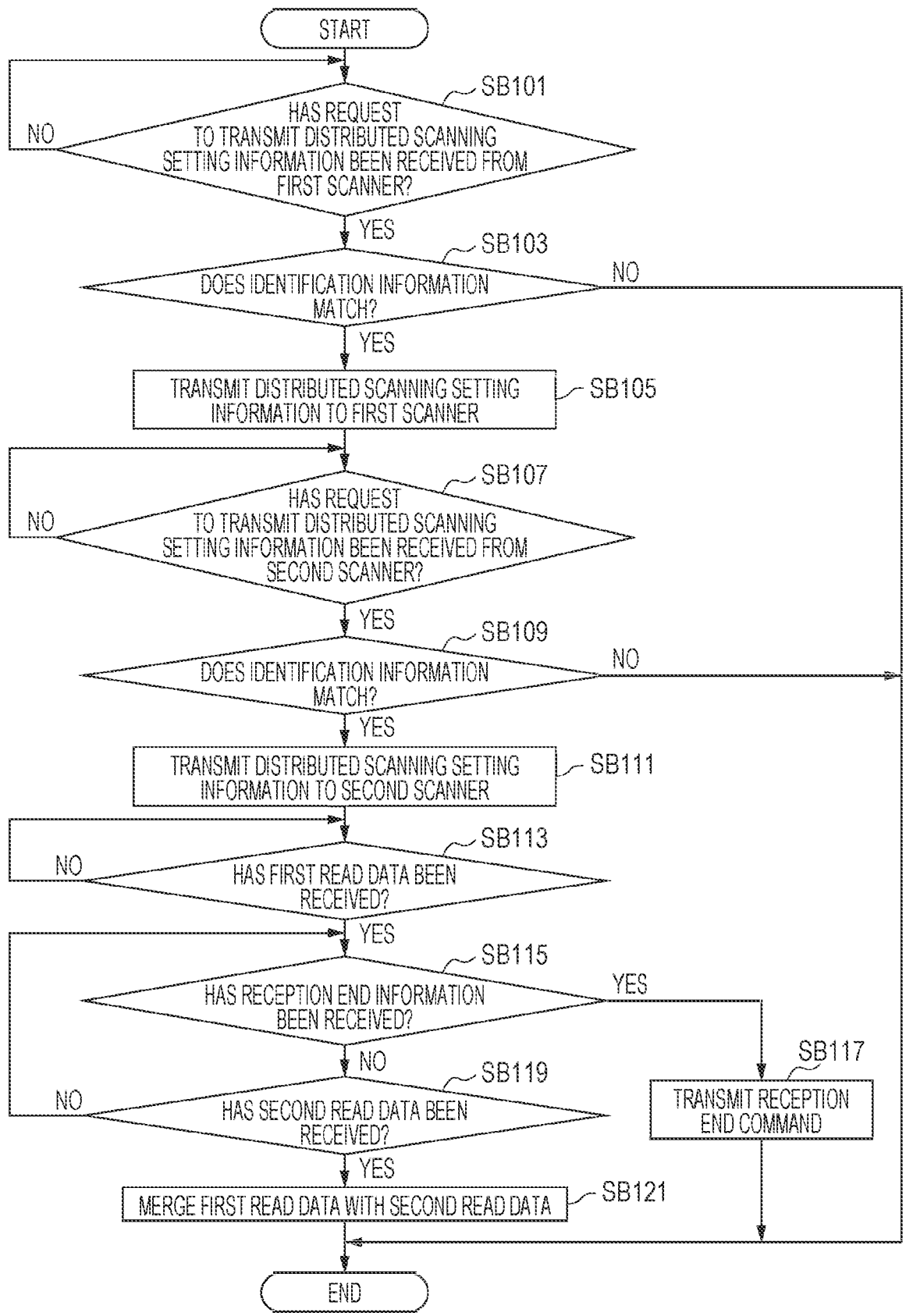
FIG. 6 is a flowchart illustrating an example of a process to be performed by a server device.
Figure 7:
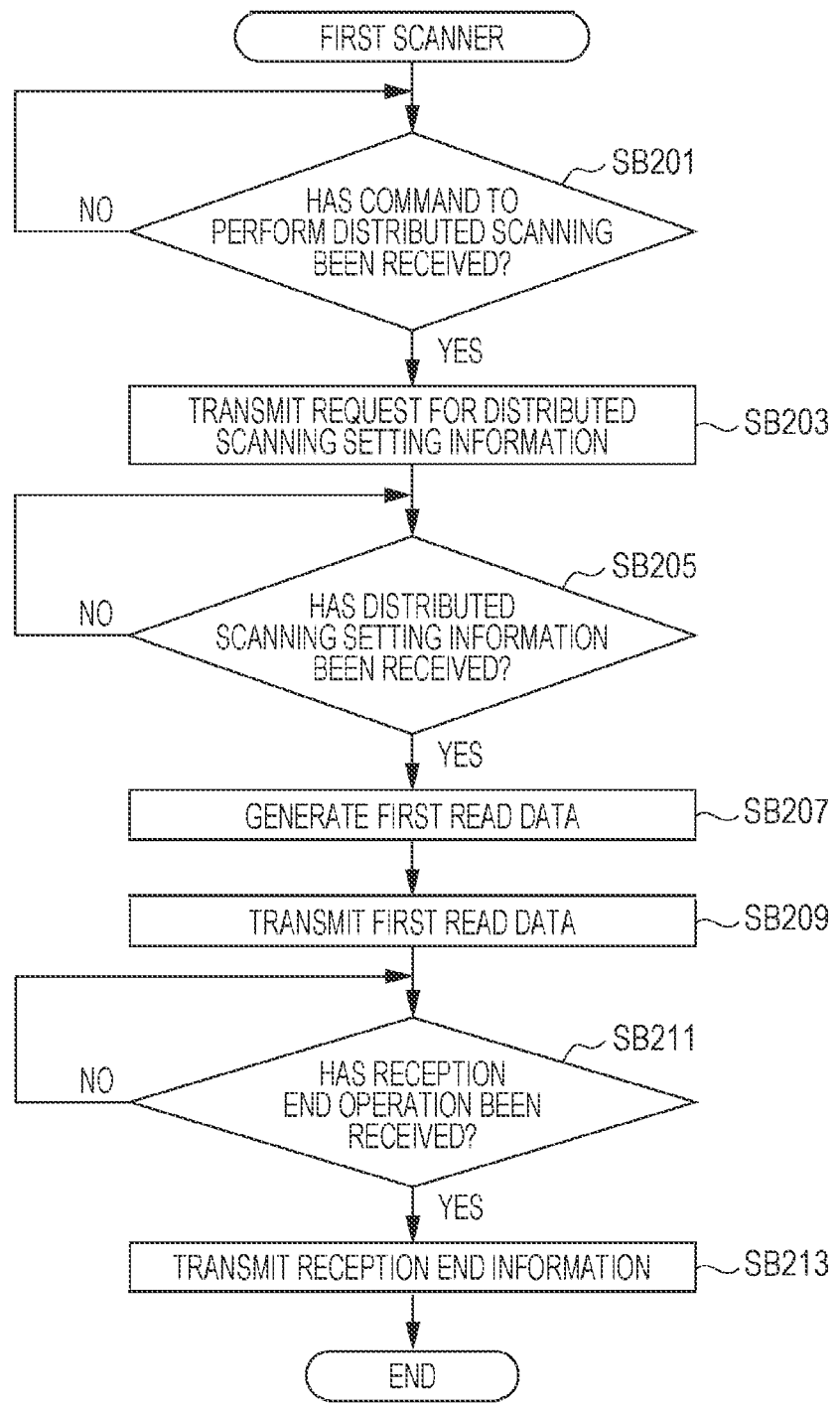
FIG. 7 is a diagram illustrating an example of a process to be performed by a first scanner.
Figure 8:
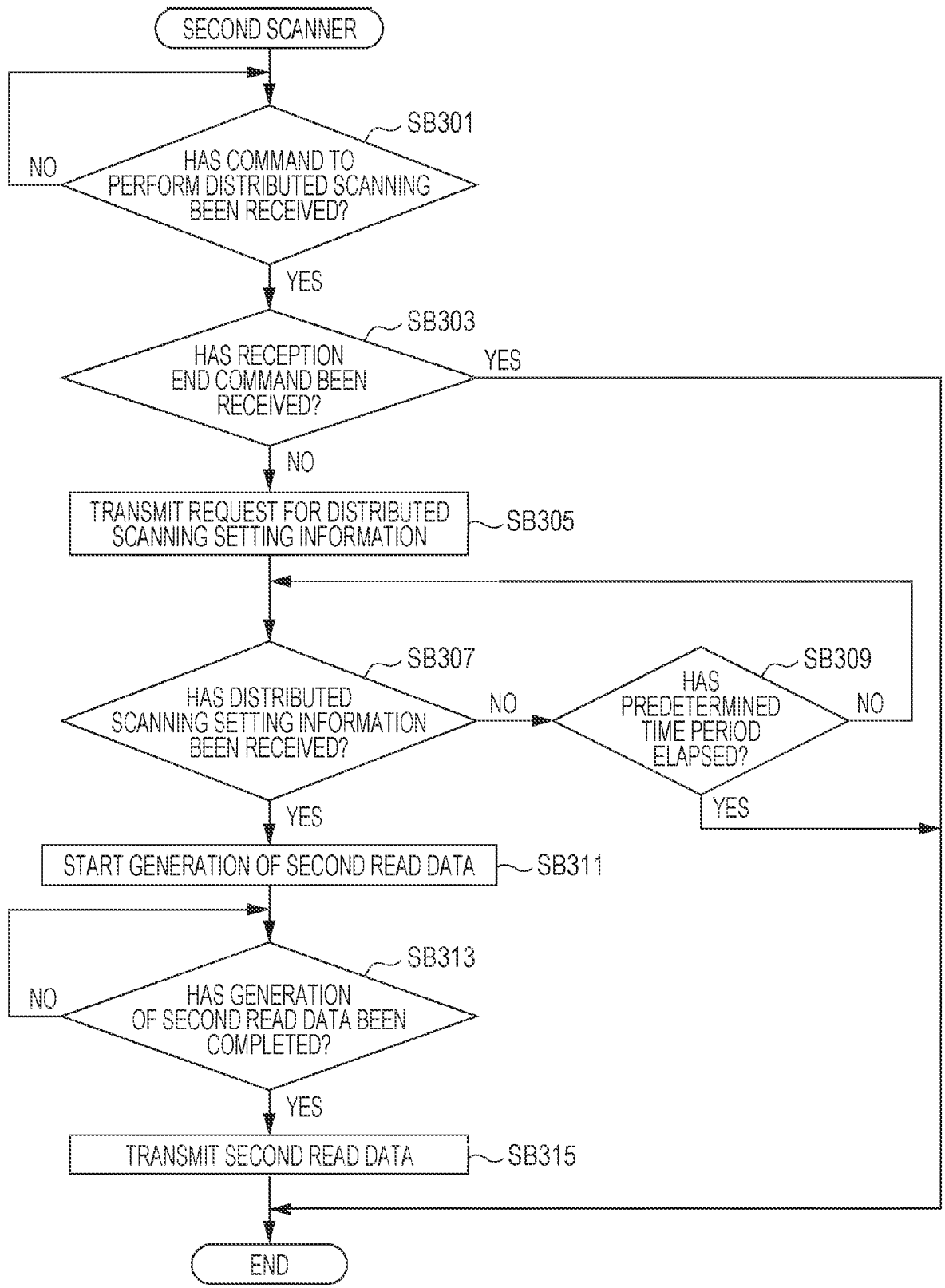
FIG. 8 is a diagram illustrating an example of a process to be performed by a second scanner.

Processes to be performed by the server controller 11, the first controller 21A, and the second controller 21B according to the second embodiment are described with reference to FIGS. 6 to 8. FIGS. 6 to 8 illustrate, for convenience, the case where the server device 1 receives the first read data DR1 from the first scanner 2A, receives the second read data DR2 from the second scanner 2B, and does not receive the third read data DR3 from a third scanner 2C.

FIG. 6 is a flowchart illustrating an example of a process to be performed by the server controller 11 of the server device 1 according to the second embodiment.

As illustrated in FIG. 6, steps SB101 to SB109 are the same processes as steps SA101 to SA109 illustrated in FIG. 3 and will not be described.

In step SB111, the server communication controller 121 transmits, to the second scanner 2B, the distributed scanning setting information DSS that is the same as the distributed scanning setting information DSS transmitted to the first scanner 2A and is associated with the identification information JD.

After the server communication controller 121 transmits the distributed scanning setting information DSS to the second scanner 2B, the server communication controller 121 determines whether the server communication controller 121 has received the first read data DR1 from the first scanner 2A in step SB113.

When the server communication controller 121 determines that the server communication controller 121 has not received the first read data DR1 from the first scanner 2A (NO in step SB113), the process becomes a standby state. When the server communication controller 121 determines that the server communication controller 121 has received the first read data DR1 from the first scanner 2A (YES in step SB113), the process proceeds to step SB115.

In step SB115, the server communication controller 121 determines whether the server communication controller 121 has received the reception end information ER from the first scanner 2A.

When the server communication controller 121 determines that the server communication controller 121 has received the reception end information ER from the first scanner 2A (YES in step SB115), the process proceeds to step SB117.

In step SB117, the server communication controller 121 transmits the reception end command EC to the second scanner 2B. After that, the process is ended.

When the server communication controller 121 determines that the server communication controller 121 has not received the reception end information ER from the first scanner 2A (NO in step SB115), the process proceeds to step SB119.

In step SB119, the server communication controller 121 determines whether the server communication controller 121 has received the second read data DR2 from the second scanner 2B.

When the server communication controller 121 determines that the server communication controller 121 has not received the second read data DR2 (NO in step SB119), the process returns to step SB115. When the server communication controller 121 determines that the server communication controller 121 has received the second read data DR2 (YES in step SB119), the process proceeds to step SB121.

In step SB121, the merging unit 122 merges the first read data DR1 with the second read data DR2. After that, the process is ended.

FIG. 7 is a flowchart illustrating an example of a process to be performed by the first controller 21A of the first scanner 2A according to the second embodiment.

As illustrated in FIG. 7, in step SB201, the first receiver 221A determines whether the first receiver 221A has received a command CM to perform the distributed scanning.

When the first receiver 221A determines that the first receiver 221A has not received the command CM to perform the distributed scanning (NO in step SB201), the process becomes a standby state. When the first receiver 221A determines that the first receiver 221A has received the command CM to perform the distributed scanning (YES in step SB201), the process proceeds to step SB203.

In step SB203, the first acquirer 222A transmits a request for the distributed scanning setting information DSS to the server device 1.

After transmitting the request for the distributed scanning setting information DSS to the server device 1, the first acquirer 222A determines whether the first acquirer 222A has received the distributed scanning setting information DSS from the server device 1 in step SB205.

When the first acquirer 222A determines that the first acquirer 222A has not received the distributed scanning setting information DSS (NO in step SB205), the process becomes the standby state. When the first acquirer 222A determines that the first acquirer 222A has received the distributed scanning setting information DSS (YES in step SB205), the process proceeds to step SB207.

In step SB207, the first reader 223A reads the first document sheet stack SD1 to generate the first read data DR1 based on the distributed scanning setting information DSS.

After the first reader 223A generates the first read data DR1, the first transmitter 224A transmits the first read data DR1 to the server device 1 in step SB209.

After the first receiver 221A receives the command CM to perform the distributed scanning, the first receiver 221A determines whether the first receiver 221A has received a reception end operation EP indicating the end of the reception of distributed scanning from a user in step SB211.

When the first receiver 221A determines that the first receiver 221A has not received the reception end operation EP (NO in step SB211), the process becomes the standby state. When the first receiver 221A determines that the first receiver 221A has received the reception end operation EP (YES in step SB211), the process proceeds to step SB213.

In step SB213, the first transmitter 224A transmits, to the server device 1, the reception end information ER indicating that the reception end operation EP has been received. After that, the process is ended.

FIG. 8 is a flowchart illustrating an example of a process to be performed by the second controller 21B of the second scanner 2B according to the second embodiment.

As illustrated in FIG. 8, in step SB301, the second receiver 221B determines whether the second receiver 221B has received a command CM to perform the distributed scanning.

When the second receiver 221B determines that the second receiver 221B has not received the command CM to perform the distributed scanning (NO in step SB301), the process becomes a standby state. When the second receiver 221B determines that the second receiver 221B has received the command CM to perform the distributed scanning (YES in step SB301), the process proceeds to step SB303.

When the first scanner 2A transmits a reception end command EC to the second scanner 2B, the second acquirer 222B determines whether the second acquirer 222B has received the reception end command EC in step SB303 before transmitting a request for the distributed scanning setting information DSS to the server device 1.

When the second acquirer 222B determines that the second acquirer 222B has not received the reception end command EC (NO in step SB303), the process proceeds to step SB305. When the second acquirer 222B determines that the second acquirer 222B has received the reception end command EC (YES in step SB303), the second acquirer 222B does not transmit the distributed scanning setting information DSS to the server device 1 and the process is ended.

In step SB305, the second acquirer 222B transmits the request for the distributed scanning setting information DSS to the server device 1.

In step SB307, the second acquirer 222B determines whether the second acquirer 222B has received the distributed scanning setting information DSS from the server device 1. When the server device 1 receives the reception end information ER from the first scanner 2A before the second acquirer 222B transmits the request for the distributed scanning setting information DSS to the server device 1, the server device 1 does not transmit the distributed scanning setting information DSS to the second scanner 2B.

When the second acquirer 222B determines that the second acquirer 222B has received the distributed scanning setting information DSS from the server device 1 (YES in step SB307), the process proceeds to step SB311. When the second acquirer 222B determines that the second acquirer 222B has not received the distributed scanning setting information DSS from the server device 1 (NO in step SB307), the process proceeds to step SB309.

In step SB309, the second controller 21B determines whether a predetermined time period has elapsed from a time when the second acquirer 222B transmitted the distributed scanning setting information DSS to the server device 1.

When the second controller 21B determines that the predetermined time period has not elapsed (NO in step SB309), the process returns to step SB307. When the second controller 21B determines that the predetermined time period has elapsed (YES in step SB309), the process is ended.

In step SB311, the second reader 223B starts reading the second document sheet stack SD2 to generate the second read data DR2 based on the distributed scanning setting information DSS.

In step SB313, the second reader 223B determines whether the second reader 223B has completed the generation of the second read data DR2.

When the second reader 223B determines that the second reader 223B has not completed the generation of the second read data DR2 (NO in step SB313), the process becomes the standby state. When the second reader 223B determines that the second reader 223B has completed the generation of the second read data DR2 (YES in step SB303), the process proceeds to step SB315.

In step SB315, the second transmitter 224B transmits the second read data DR2 to the server device 1. After that, the process is ended.

In the second embodiment, as described with reference to FIGS. 6 to 8, the merging unit 122 determines, based on the reception end information ER, whether to merge the first read data DR1 with the second read data DR2. Therefore, the merging unit 122 can easily determine whether to merge the first read data DR1 with the second read data DR2, as compared with the first embodiment.

As described with reference to FIGS. 1 to 8, the image reading system 100 according to the present embodiment includes the server device 1, the first scanner 2A communicably connected to the server device 1, and the second scanner 2B communicably connected to the server device 1. The server 1 includes the distributed scanning storage unit 131 that stores the distributed scanning setting information DSS including the identification information JD and defining the setting item of the distributed scanning. The first scanner 2A includes the first receiver 221A that receives, from a user, a command CM that includes the identification information JD and is a command to perform the distributed scanning, the first acquirer 222A that acquires the distributed scanning setting information DSS associated with the identification information JD from the server device 1 when the first receiver 221A receives the command CM to perform the distributed scanning, the first reader 223A that reads the first document sheet stack SD1 to generate the first read data DR1 based on the distributed scanning setting information DSS, and the first transmitter 224A that transmits the first read data DR1 to the server device 1. The second scanner 2B includes the second receiver 221B that receives, from a user, a command CM that includes the identification information JD and is a command to perform the distributed scanning, the second acquirer 222B that acquires the distributed scanning setting information DSS associated with the identification information JD from the server device 1 when the second receiver 221B receives the command CM to perform the distributed scanning, the second reader 223B that reads the second document sheet stack SD2 to generate the second read data DR2 based on the distributed scanning setting information DSS, and the second transmitter 224B that transmits the second read data DR2 to the server device 1.

In the first scanner 2A, when the first receiver 221A receives the command CM to perform the distributed scanning, the first acquirer 222A acquires the distributed scanning setting information DSS from the server device 1. In the second scanner 2B, when the second receiver 221B receives the command CM to perform the distributed scanning, the second acquirer 222B acquires the distributed scanning setting information DSS from the server device 1. Therefore, the distributed scanning can be easily set in each of the first scanner 2A and the second scanner 2B.

The server device 1 includes the merging unit 122 that merges the first read data DR1 with the second read data DR2.

The server device 1 can easily merge the first read data DR1 with the second read data DR2. Therefore, the distributed scanning can be easily performed.

The distributed scanning setting information DSS includes, as the setting item, the reception period ET to a time when the reception of a command CM to perform the distributed scanning is ended. The first transmitter 224A transmits, to the server device 1, the first reception time and date information RT1 indicating the time and date when the first receiver 221A received the command CM to perform the distributed scanning. The second transmitter 224B transmits, to the server device 1, the second reception time and date information RT2 indicating the time and date when the second receiver 221B received the command CM to perform the distributed scanning. The merging unit 122 merges the first read data DR1 with the second read data DR2 when the second receiver 221B receives the command CM to perform the distributed scanning before the reception period ET elapses from the time when the first receiver 221A receives the command CM to perform the distributed scanning.

By providing the command CM to perform the distributed scanning to the second scanner 2B from the user before the reception period ET elapses from the time when the first receiver 221A receives the command CM to perform the distributed scanning, it is possible to merge the first read data DR1 with the second read data DR2.

When the second receiver 221B receives the command CM to perform the distributed scanning after the reception period ET elapses from the time when the first receiver 221A receives the command CM to perform the distributed scanning, the merging unit 122 does not merge the first read data DR1 with the second read data DR2.

By appropriately setting the value of the reception period ET, it is possible to appropriately determine whether to merge the first read data DR1 with the second read data DR2.

In the first scanner 2A, the first receiver 221A receives the reception end operation EP indicating the end of the reception of the distributed scanning from the user. When the first receiver 221A receives the reception end operation EP, the first transmitter 224A transmits, to the server device 1, the reception end information ER indicating that the reception end operation EP has been received. When the server device 1 receives the second read data DR2 from the second scanner 2B after receiving the reception end information ER from the first scanner 2A, the merging unit 122 does not merge the first read data DR1 with the second read data DR2.

That is, when the server device 1 receives the second read data DR2 from the second scanner 2B after receiving the reception end information ER from the first scanner 2A, the merging unit 122 does not merge the first read data DR1 with the second read data DR2. Therefore, when the user appropriately performs the reception end operation EP, it is possible to appropriately determine whether to merge the first read data DR1 with the second read data DR2.

When the server device 1 receives the second read data DR2 from the second scanner 2B before receiving the reception end information ER, the merging unit 122 merges the first read data DR1 with the second read data DR2.

When the reception end operation EP is performed such that the server device 1 receives the second read data DR2 from the second scanner 2B before receiving the reception end information ER, it is possible to merge the first read data DR1 with the second read data DR2.

The first scanner 2A according to the present embodiment is communicably connected to the server device 1 and includes the first receiver 221A that receives, from the user, a command CM that includes the identification information JD identifying the distributed scanning and is a command to perform the distributed scanning, the first acquirer 222A that acquires the distributed scanning setting information DSS from the server device 1 when the first receiver 221A receives the command CM to perform the distributed scanning, the first reader 223A that reads the first document sheet stack SD1 to generate the first read data DR1 based on the distributed scanning setting information DSS, and the first transmitter 224A that transmits the first read data DR1 to the server device 1.

In the first scanner 2A, when the first receiver 221A receives the command CM to perform the distributed scanning, the first acquirer 222A acquires the distributed scanning setting information DSS from the server device 1. Therefore, it is possible to easily set the distributed scanning in the first scanner 2A.

The server device 1 according to the present embodiment is communicably connected to the first scanner 2A and the second scanner 2B, and includes the distributed scanning storage unit 131 that stores the identification information JD identifying the distributed scanning, and the distributed scanning setting information DSS including the setting item of the distributed scanning and associated with the identification information JD, the server communication controller 121 that transmits the distributed scanning setting information DSS to the first scanner 2A and the second scanner 2B upon receiving a request for the distributed scanning setting information DSS specified in the identification information JD from the first scanner 2A or the second scanner 2B, and receives the first read data DR1 and the second read data DR2 from the first scanner 2A and the second scanner 2B, and the merging unit 122 that merges the first read data DR1 received by the server communication controller 121 with the second read data DR2 received by the server communication controller 121.

Upon receiving the request for the distributed scanning setting information DSS specified in the identification information JD from the first scanner 2A or the second scanner 2B, the server device 1 transmits the distributed scanning setting information DSS to the first scanner 2A and the second scanner 2B. Therefore, it is possible to easily set the distributed scanning in the first scanner 2A and the second scanner 2B.

The server device 1 receives the first read data DR1 and the second read data DR2 from the first scanner 2A and the second scanner 2B and merges the first read data DR1 with the second read data DR2. Therefore, it is possible to merge the first read data DR1 with the second read data DR2.

The present disclosure is not limited to the configurations described in the embodiments and can be implemented in various aspects without departing from the gist of the present disclosure.

The case where the "image reading devices" are the scanners 2 is described in the embodiments, but the present disclosure is not limited thereto. As long as the "image reading devices" have an image reading function, the "image reading devices" may be copying machines or multifunction machines having a facsimile function.

The case where the server device 1 is communicably connected to the first scanner 2A, the second scanner 2B, and the third scanner 2C is described in the embodiments, but the present disclosure is not limited thereto. It is sufficient if the server device 1 is connected to at least two scanners 2. The server device 1 may be communicably connected to two scanners 2 or may be communicably connected to, for example, four or more scanners 2.

At least some of the functional blocks illustrated in FIGS. 1 to 3 may be implemented as hardware or may be implemented as hardware and software. The present disclosure is not limited to the configurations in which the hardware resources independent of each other are arranged as illustrated in FIGS. 1 to 3.

The server control program PG1 that is executed by the server processor 12 of the server controller 11 of the server device 1 is stored in the server memory 13. However, the server control program PG1 may be stored in an HDD or the like. Similarly, the first control program PG2A that is executed by the first processor 22A of the first controller 21A of the first scanner 2A is stored in the first memory 23A. However, the first control program PG2A may be stored in an HDD or the like. The second control program PG2B that is executed by the second processor 22B of the second controller 21B of the second scanner 2B is stored in the second memory 23B. However, the second control program PG2B may be stored in an HDD or the like.

The steps of the processes of the flowcharts illustrated in FIGS. 4 to 8 are obtained by dividing the processes based on the main contents of the processes in order to easily understand each of the processes that are performed by the server controller 11 of the server device 1, the first controller 21A of the first scanner 2A, and the second controller 21B of the second scanner 2B. The embodiments are not limited by the method for dividing the processes of the flowcharts illustrated in FIGS. 4 to 8 and the names of the processes. The processes by the server controller 11, the first controller 21A, and the second controller 21B may be divided into a larger number of steps of the processes or may be divided such that one or more of steps of the processes include a larger number of processes. In addition, the order of the processes of the foregoing flowcharts is not limited to the examples illustrated.

The server control program PG1, the first control program PG2A, and the second control program PG2B can be recorded in a computer-readable recording medium. As the recording medium, a magnetic recording medium, an optical recording medium, or a semiconductor memory device can be used. Specifically, examples of the recording medium are a flexible disk, a compact disc read-only memory (CD-ROM), a digital versatile disc (DVD), a Blu-ray (registered trademark) disc, a magneto-optical disc, a flash memory, and a portable or fixed recording medium such as a card type recording medium. In addition, the recording medium may be a nonvolatile storage device that is an internal storage device included in the server device 1 and is, for example, a RAM, a ROM, an HDD, or the like.

In addition, the first control program PG2A and the second control program PG2B may be stored in the server device or the like and downloaded from the server device or the like to the first scanner 2A and the second scanner 2B, respectively.

What is claimed is:

1. An image reading system comprising:
a server device;
a first image reading device communicably connected to the server device; and
a second image reading device communicably connected to the server device, wherein
the server device includes a distributed scanning storage unit that stores identification information identifying distributed scanning, and a distributed scanning setting including a setting item of the distributed scanning and associated with the identification information,
the first image reading device includes a first receiver that receives, from a user, a command that includes the identification information and is a command to perform the distributed scanning,
a first acquirer that acquires the distributed scanning setting associated with the identification information from the server device when the first receiver receives the command to perform the distributed scanning,
a first reader that reads a first document sheet stack to generate first read data based on the distributed scanning setting, and
a first transmitter that transmits the first read data to the server device, and
the second image reading device includes
a second receiver that receives, from a user, a command that includes the identification information and is a command to perform the distributed scanning,
a second acquirer that acquires the distributed scanning setting associated with the identification information from the server device when the second receiver receives the command to perform the distributed scanning,
a second reader that reads a second document sheet stack to generate second read data based on the distributed scanning setting, and
a second transmitter that transmits the second read data to the server device.

2. The image reading system according to claim 1, wherein,
the server device includes a merging unit that merges the first read data with the second read data.

3. The image reading system according to claim 2, wherein
the distributed scanning setting includes, as the setting item, a reception period to a time when the reception of a command to perform the distributed scanning is ended,
the first transmitter transmits, to the server device, a time and date when the first receiver received the command to perform the distributed scanning,
the second transmitter transmits, to the server device, a time and date when the second receiver received the command to perform the distributed scanning, and
the merging unit merges the first read data with the second read data when the second receiver receives the command to perform the distributed scanning before the reception period elapses from a time when the first receiver receives the command to perform the distributed scanning.

4. The image reading system according to claim 3, wherein
the merging unit does not merge the first read data with the second read data when the second receiver receives the command to perform the distributed scanning after the reception period elapses from the time when the first receiver receives the command to perform the distributed scanning.

5. The image reading system according to claim 2, wherein
the first image reading device uses the first receiver to receive, from the user, a reception end operation indicating the end of the reception of the distributed scanning,
when the first receiver receives the reception end operation, the first image reading device uses the first transmitter to transmit, to the server device, reception end information indicating that the reception end operation was received, and when the server device receives the second read data from the second image reading device after receiving the reception end information from the first image reading device, the merging unit does not merge the first read data with the second read data.

6. The image reading system according to claim 5, wherein when the server device receives the second read data from the second image reading device before receiving the reception end information, the server device uses the merging unit to merge the first read data with the second read data.

7. An image reading device communicably connected to a server device, comprising:

a receiver that receives, from a user, a command that includes identification information identifying distributed scanning and is a command to perform the distributed scanning;

an acquirer that acquires a distributed scanning setting associated with the identification information from the server device when the receiver receives the command to perform the distributed scanning;

a reader that reads a document sheet stack to generate read data based on the distributed scanning setting; and a transmitter that transmits the read data to the server device.

8. A server device communicably connected to a first image reading device and a second image reading device, comprising:

a distributed scanning storage unit that stores identification information identifying distributed scanning, and a distributed scanning setting including a setting item of the distributed scanning and associated with the identification information;

a server communication unit that transmits the distributed scanning setting associated with the identification information to the first image reading device and the second image reading device upon receiving a request for the distributed scanning setting specified in the identification information from the first image reading device or the second image reading device, receives first read data from the first image reading device, and receives second read data from the second image reading device; and a merging unit that merges the first read data received by the server communication unit with the second read data received by the server communication unit.

* * * * *